United States Patent Office 2,783,243
Patented Feb. 26, 1957

2,783,243

HETEROCYCLIC HYDRAZINIUM CHLORIDES

Bernard Rudner, Baltimore, Md., assignor to W. R. Grace & Co., New York, N. Y., a corporation of Connecticut No Drawing. Application January 3, 1956,
Serial No. 556,824

10 Claims. (Cl. 260—309.6)

This invention relates to a class of substituted organic compositions, the structure of which contains a substituted hydrazine, more particularly to a class of quaternary salts known as hydrazinium chlorides. In one specific aspect, it relates to a new class of chemical compounds, which can be described as heterocyclic hydrazinium chlorides.

Heretofore, quaternary hydrazinium salts containing a heterocycle have been relatively unknown. Compounds of the type embraced by my invention, wherein the quaternized nitrogen is doubly bonded endocyclically with a carbon atom in the heterocyclic ring and the other nitrogen of the hydrazine radical is exocyclic, were heretofore totally unknown.

It has recently been discovered that chloramine will react with tertiary amines to give the corresponding 1,1,1-trisubstituted hydrazinium chloride. This reaction has opened a wide field of potential chemistry relating to hydrazine derivatives, as it provides a simple, commercially practical way of obtaining many heretofore unknown compounds. Tertiary amines are readily available bases, and chloramine can be obtained economically by the well-known process of Harry H. Sisler et al., described in U. S. Patent No. 2,710,248, wherein chlorine and ammonia are reacted in the vapor phase to produce chloramine (monochloramine).

The chloramine tertiary amine reactions work decidedly well under a wide variety of conditions. It may be conducted successfully using as a solvent either an excess of the reactant amine or an unreactive organic liquid. The reaction may also be carried out in aqueous solution if such conditions appeared to be preferable. The term unreactive as applied to the organic solvent is intended to embrace those solvents which do not react with ammonia, chloramine, or the tertiary amine selected for the reaction under the conditions employed. When the reaction is conducted in anhydrous solution, the desired hydrazinium chloride frequently precipitates as the reaction progresses. In aqueous solution, however, it is usually necessary to concentrate the solution or to evaporate to dryness in order to obtain the desired product. If gaseous chloramine is to be used as a reactant, the presence of a base, e. g. ammonia, is required to stabilize the chloramine. Nitrogen may be used as a diluent, although it is not essential, for this gaseous mixture.

In accordance with the present invention, I have found a novel and potentially useful generic class of hydrazinium chlorides which corresponds to the general formula:

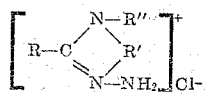

where R is an alkyl or alkenyl radical of varying degrees of unsaturation and contains not more than 89 carbon atoms, R' is a hydrocarbon chain containing not less than 2 contiguous carbon atoms, and R'' is a member selected from the group consisting of hydrogen, alkyl, hydroxyalkyl, hydroxyalkoxyalkyl, hydroxypolyalkoxyalkyl, β-aminoalkyl and β-aminoalkylaminoalkyl radicals. These novel compounds have been prepared by a novel reaction; that of chloramine with a non-aromatic heterocycle containing an endocyclic C=N double bond.

It is therefore an object of the present invention to provide a new class of potentially useful hydrazinium salts which can be made in commercial quantities.

In practicing my invention, for example, a gaseous mixture of chloramine, ammonia, and nitrogen can be passed into the applicable heterocyclic base. Typical heterocyclic amines which produce members of my novel class including such compounds as given in the following table:

TABLE I

| Heterocyclic amine | Name of product | Structure of product |
|---|---|---|
| 2-ethyl-2-imidazoline | 3-amino-2-ethyl-2-imidazolininium chloride. | 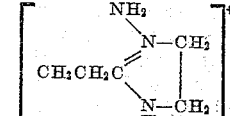 |
| 1-β-hydroxyethyl-2-undecyl-2-imidazoline. | 3-amino-1-β-hydroxyethyl-2-undecyl-2-imidazolininium chloride. | 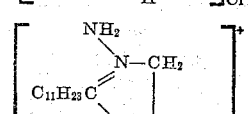 |
| 1-β-cyanoethyl-2-heptadecyl-4-β-hydroxyethyl-2-imidazoline. | 3-amino-1-β-cyanoethyl-2-heptadecyl-4-β-hydroxyethyl-2-imidazolininium chloride. | 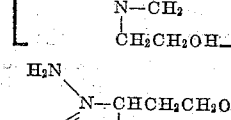 |
| 1-β-oleylamidoethyl-2-heptadecenyl-2-imidazoline. | 3-amino-2-heptadecenyl-1-β-oleylamidoethyl-2-imidazolininium chloride. | 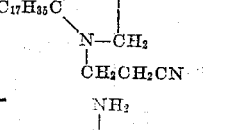 |

These suggested amines are intended merely to be illustrative, as there are a wide range of homologues which would be equally applicable in production of individual species of my new and novel class. Many of the aforementioned heterocyclic amines, have a distinct advantage in that they are currently available in commercial quantities.

I have successfully obtained my unique compounds when I have conducted the reaction of chloramine and applicable amine in anhydrous solution in the presence of excess amine used as a solvent, in anhydrous solution the presence of an unreactive organic solvent, or an aqueous solution. I have found it convenient, for example, to use such solvents as xylene, dimethylformamide, dioxan, and trichloroethylene, although many others would be suitable. My novel compounds can be readily recovered from the reaction mixture by conventional laboratory procedures.

My invention is further illustrated by the following examples:

Example I

A generator was constructed to produce a gaseous mixture of chloramine and ammonia using the aforementioned procedure of Sisler et al. Such a gaseous mixture was bubbled into 15 grams of 1-alkyl-2-heptadecenyl-2-imidazoline (known commercially as Amine O) in 300 mls. of trichloroethylene for one hour. Some heat was evolved and a white precipitate appeared during the reaction. The precipitate was separated from the trichloroethylene solution by filtration. Washing, and drying of this substance gave 5.8 grams of solid which was, by chloride titration, approximately 8% product and 92% NH₄Cl. Extraction of the solid with hot 2-propanol gave, on evaporation of the filtrate, approximately 0.5 g. of a tan wax, crude 1-alkyl-2-heptadecenyl-3-amineimidazolininium chloride. Evaporation of the original trichloroethylene solution gave almost 17 g. of a red paste.

The red paste was subjected to numerous tests to establish its identity. The reactions corresponded to those of the aforementioned product, 1-alkyl-2-heptadecenyl-3-aminoimidazolininium chloride. It was triturated first with hexane, then repeatedly with dry acetone. The ultimate result of this treatment was an (air dried) tan wax, darkening at 140° C. and melting at 185°–90° C. It was readily soluble in cold water with foaming. Addition of caustic did not give an immediate precipitate, but the clear solution thus obtained became a strong reducing agent (the parent Amine O is water-and-alkali-insoluble. Its acid solutions are weak reductants and, on being made alkaline, precipitate Amine O). My new compound was found to be soluble in alcohol, but it exhibited a lesser degree of solubility in other organic solvents than the parent amine. The aqueous solutions of my novel compound were strong dispersing agents, even for inorganic solids like AgCl. It did not yield a picrate with aqueous picric acid (the parent amine does), nor did it form an insoluble hexafluorophosphate with saturated aqueous KPF₆. It did form an oily, light-unstable mercuric-iodide with aqueous KHgI₃.

The structure of my compound is believed to be the 1-alkyl-3-amino compound (A) instead of the isomeric 1-alkyl-1-amino salt (B)

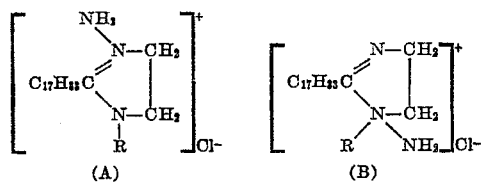

because hot alkali converts it to an acid-soluble, water-insoluble base, without liberation of any volatile base.

The parent amine, Amine O, is a commercially available waxy mixture, described by its manufacturer as a 1-alkyl-2-heptadecenyl-2-imidazoline, of molecular weight 355. It is insoluble in cold water, partially dispersible in hot water, soluble in dilute acid and soluble in the common organic solvents. Although it is advertised as having a melting point of approximately 5° C., on the melting block used for the work described here it ran clear at 46–51° C. Amine O acts as a solvent and solubilizer for my product in organic solvents, just as my product (with its remarkable surfactant properties) will disperse the parent amine in water. This tendency to co-solution does not simplify purification procedures.

Example II

A solution of 21 g. of 1-(β-aminoethylaminoethyl)-2-alkyl-2-imidazoline (sold commercially as "Wax Amine A") in 100 ml. xylene was treated with gaseous chloramine as described in Example I. A strongly exothermic reaction ensued. Heat was evolved to such an extent that a water-bath was required to keep the reaction temperature below 60° C. A mixture of crystalline and waxy precipitates formed which tended to plug the gas inlet tube. Plugging eventually compelled the shortening of the reaction time to 47 minutes. Filtration, washing and drying gave 23 g. of tan solid, partially wax and partially brittle crystals, which melted, in part, at 78–82° C., and in part charred without melting at 230° C. On the basis of analytical data, the crude product was a 45–55 mixture with ammonium chloride. On the basis of parent amine recovered from the filtrate, the conversion was 87% of theory. The formative reaction can be written as:

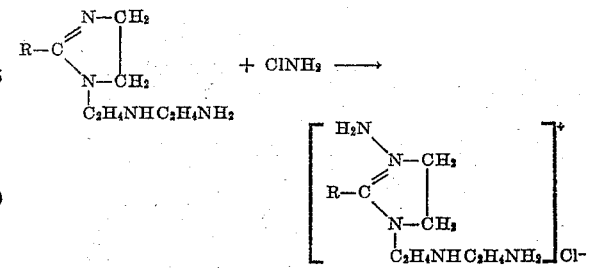

The product can therefore be named 1-β-Aminoethyl-aminoethyl-2-alkyl-3-amino-2-imidazolininium chloride, where "alkyl" indicates a mixture of 40–80 C atom chains, with C₅₀H₁₀₁, being about average. After being twice recrystallized from 2-propanol, it consisted of light tan amorphous plates, with a melting point of 88–89° C. The plates were soluble or dispersible (depending on quantity) in water and insoluble in hexane. They formed from aqueous acetone, an insoluble white hexafluorophosphate, with a melting point of 63–67° C. when reacted with KPF₆.

Example III

A solution of 23 g. of 1-β-aminoethyl-2-alkyl-2-imidazoline in 100 ml. xylene (obtainable commercially as Wax Amine B) was treated with chloramine by the procedure described in Example II for 72 minutes, with very similar results. Filtration gave 25.9 g. of a brown wax, which by analysis, was shown to represent a 55.4% yield of product admixed with about an equal weight of ammonium chloride. The crude mixture showed partial melting at 84–86° C., with charring at 210° C. Recrystallization from absolute alcohol gave amorphous tan plates, M. P. 85–86° C., of 1-β-aminoethyl-2-alkyl-3-amino-2-imidazolininium chloride. This novel product is represented by the following structural formula:

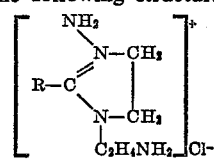

(wherein R is the same as Cl⁻ described in Example II)

In properties, it resembled the product of Example II, except that it did not form an insoluble hexafluorophosphate. It did, however, yield a hexachloroferriate, appearing as highly hygroscopic brown cubes, which had a melting point of 168–71° C. when reacted with an appropriate reagent.

*Example IV*

Addition of 0.3 g. chloramine dissolved in 30 ml. xylene to 10 ml. of a 5% alkylated imidazoline (known commercially as Amine C) solution in xylene, gave after several hours aproximately 0.5 g. of an amorphous white solid, which melted over a crude range beginning at 170° C. The product was a mixture of homologues, the major constituent of which was identified as the novel 1-alkyl-2-undecyl-3-amino-2-imidazolininium chloride. This new compound was distinctly water-soluble with foaming. It reduced alkaline permanganate solution, but did not form insoluble salts with the usual dewaterizing reagents. Purification by use of 2-propanol gave a 53% yield of my product, as a waxy white solid, which had a melting point of 126–131° C., and which formed a diliturate (M. P. 246–250° C.) with the addition of aqueous 5-nitro-barbituric acid.

*Example V*

Repetition of the procedure of Example IV using a similar cation active heterocycle known commercially as Amine S gave a similar crude product, one important constituent of which was the 2-heptadecyl homologue. Recrystallization from 2-propanol gave off-white microcrystals melting at 86–89° C. The recrystallized product was clearly soluble in hot water, slowly soluble in cold water (with foaming), soluble in alcohol, and insoluble in carbon tetrachloride and hexane. It slowly yielded a water-insoluble hexafluorophosphate melting at 158–162° C. (d.) and a white diliturate that decomposed at approximately 246° C., when reacted with the appropriate reagents.

*Example VI*

The procedure of Example III was repeated using 17.7 g. 1-β-hydroxyethylamino-2-heptadecenyl-2-imidazoline (available commercially as Amine 220). During a mildly exothermic but slow reaction an initial precipitate formed, consisting of 8.6 g. of off-white solid, very largely ammonium chloride. Extraction of this solid with 2-propanol gave a modicum of crude 3-amino-1-β-hydroxyethyl-2-heptadecenyl-2-imidazolinium chloride. This novel compound appeared as off-white, waxy cubes, which, with the application of heat exhibited inchoate sublimation at 63° C., but did not melt until the temperature was raised to above 200° C. It did not yield an insoluble hexafluorophosphate, but it slowly formed an insoluble gray, microcrystalline diliturate (M. P. 189–193° C. (d.)) with the addition of aqueous 5-nitro-barbituric acid.

My invention provides a new class of chemically useful compounds that can be readily prepared on a commercial basis. My compounds derive full benefit of the physical characteristics inherent in their quaternized structure.

For example, my new compounds having a $C_9$–$C_{20}$ carbon atom chain as the 2-substituent (R in the designated structural formula) are excellent leveling agents for the dye industry. Certain dyes have too rapid an affinity for fabric. Accordingly, when my compounds ($C_9$–$C_{20}$ carbon atom chain) are added to the dye bath before the addition of the fabric, they shift the dye-water, dye-fiber equilibrium, thereby reducing the affinity of the dye for the fabric. This adjustment eliminates gradation of tone; the resulting treated fabric is uniform in color.

When my compounds are added to aqueous solutions of acid dyes (i. e. those substances containing sulfonic, carboxylic, or other acid groups), they produce the high molecular weight hydrazinium salt of the acid dye. The resulting dyes are intense in color. Their physical properties vary with the chain length of the 2-substituent of the hydrazinium salt as well as with the nature of the acid dye. Those dyes having a chain length of 9–20 carbon atoms are solvent soluble and water insoluble, making them useful as wood finishes. As the length of the carbon chain is increased, the solvent solubility range narrows. Those compounds having a $C_{80}$–$C_{89}$ carbon chain are useful coloring matters for gasoline.

My higher molecular weight salts (21–89 carbon atom chain) are oil soluble. Their substantial anti-oxidant power makes them excellent additives for lubricating and cutting oils. For instance, when a small quantity of one of my hydrazinium salts is dissolved in organic solution (e. g. a high boiling petroleum cut) and then dispersed in water an excellent cutting oil is produced for machine shop work. The hydrazinium compound successfully combats any rust-forming tendency when the water emulsion is in contact with machine shop equipment. Those compounds having a lower molecular weight (9–20 carbon atom chain) have remarkable surfactant properties.

I claim:

1. New chemical compounds having the general formula:

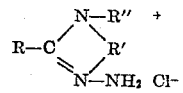

wherein R is a member selected from the group consisting of higher alkyl and alkenyl radicals containing at least 9 and not more than 89 carbon atoms; R' is a hydrocarbon chain of not more than 5 carbon atoms containing 2 contiguous endocyclic carbon atoms; and R" is a member selected from the group consisting of hydrogen, alkyl, hydroxyalkyl, β-aminoalkyl, and β-aminoalkylaminoalkyl substituents, wherein alkyl is a hydrocarbon chain of less than 5 carbon atoms.

2. New chemical compounds having the general formula:

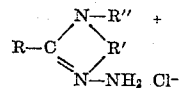

wherein R is a higher alkyl radical containing at least 9 and not more than 19 carbon atoms; R' is a hydrocarbon chain of not more than 5 carbon atoms containing 2 contiguous endocyclic carbon atoms; and R" is an alkyl radical having less than 5 carbon atoms.

3. New chemical compounds, having the general formula:

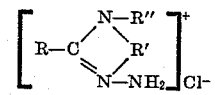

wherein R is a monovalent higher alkenyl radical containing at least 9 and not more than 19 carbon atoms, R' is a hydrocarbon chain of not more than 5 carbon atoms containing 2 contiguous endocyclic carbon atoms, and R" is a hydroxyalkyl radical wherein alkyl is a hydrocarbon chain of less than 5 carbon atoms.

4. New chemical compounds, having the general formula:

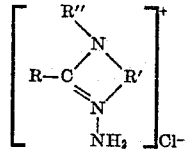

wherein R is an alkyl radical containing at least 9 and not more than 89 carbon atoms, R' is a hydrocarbon chain of not more than 5 carbon atoms containing two contiguous endocyclic carbon atoms, and R" is an β-aminoalkyl radical wherein alkyl is a hydrocarbon chain of less than 5 carbon atoms.

5. New chemical compounds, of the general formula:

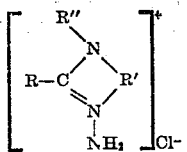

wherein R is an alkyl radical containing at least 9 and not more than 89 carbon atoms, R' is a hydrocarbon chain of not more than 5 carbon atoms containing two contiguous endocyclic carbon atoms, and R'' is an β-aminoalkylaminoalkyl radical wherein alkyl is a hydrocarbon chain of less than 5 carbon atoms.

6. As a new chemical compound, 3-amino-1-(2-hydroxyethyl)-2-heptadecenyl-2-imidazolininium chloride.

7. As a new chemical compound, 3-amino-1-alkyl-2-heptadecyl-2-imidazolininium chloride.

8. As a new chemical compound, 3-amino-1-alkyl-2-undecyl-2-imidazolininium chloride.

9. As a new chemical compound, 3-amino-1-β-aminoethyl-2-alkyl-2-imidazolininium chloride.

10. As a new chemical compound, 3-amino-1-(β-aminoethylaminoethyl)-2-alkyl-2-imidazolininium chloride.

No references cited.